(12) United States Patent
Walton

(10) Patent No.: US 10,469,708 B2
(45) Date of Patent: Nov. 5, 2019

(54) SYSTEMS AND METHODS FOR IMAGE OPTIMIZATION AND ENHANCEMENT IN ELECTROPHOTOGRAPHIC COPYING

(71) Applicant: SYNAPTICS INCORPORATED, San Jose, CA (US)

(72) Inventor: Derek Walton, Keene, NH (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/900,588

(22) Filed: Feb. 20, 2018

(65) Prior Publication Data

US 2018/0241909 A1 Aug. 23, 2018

Related U.S. Application Data

(60) Provisional application No. 62/460,636, filed on Feb. 17, 2017.

(51) Int. Cl.
*G06K 15/00* (2006.01)
*H04N 1/405* (2006.01)
*H04N 1/409* (2006.01)

(52) U.S. Cl.
CPC ........... *H04N 1/4092* (2013.01); *H04N 1/405* (2013.01); *H04N 2201/0091* (2013.01)

(58) Field of Classification Search
CPC .... H04N 1/4092; H04N 1/405; H04N 1/4105; H04N 2201/0091
See application file for complete search history.

(56) References Cited

U.S. PATENT DOCUMENTS

| 7,079,687 | B2 | 7/2006 | Guleryuz | |
|---|---|---|---|---|
| 8,665,498 | B2 | 3/2014 | Jonsson et al. | |
| 9,147,232 | B1* | 9/2015 | Kuo | G06T 5/30 |
| 2004/0036923 | A1* | 2/2004 | Kokemohr | G06T 5/004 358/3.27 |
| 2010/0321531 | A1* | 12/2010 | Zhang | G06T 5/008 348/234 |
| 2013/0342736 | A1* | 12/2013 | Numata | G06T 5/002 348/241 |
| 2014/0003734 | A1* | 1/2014 | Umansky | G06T 5/003 382/275 |
| 2015/0003528 | A1* | 1/2015 | Toichi | H04N 19/521 375/240.14 |
| 2016/0364839 | A1* | 12/2016 | Duan | G06K 9/00536 |

* cited by examiner

*Primary Examiner* — Moustapha Diaby
(74) *Attorney, Agent, or Firm* — Haynes and Boone, LLP

(57) ABSTRACT

Systems and methods for enhancing an image for printing include identifying a plurality of true edge positions in a scanned digital image, generating an edge restoration signal based on image data at the plurality of true edge positions, generating a boost value for each pixel position in the image as a function of the edge restoration signal and an unsharp masking of the image, and generating an enhanced image. A system may include a print interface, an image interface receiving a digital image without an explicit K component, and an image processing module that computes a halftone energy measure, an edge strength, and a colorfulness measure, generate a K component based on the halftone energy measure, the edge strength, and the colorfulness measure, and output data representing the image and a K component to the print engine.

20 Claims, 4 Drawing Sheets

SYSTEMS AND METHODS FOR IMAGE OPTIMIZATION AND ENHANCEMENT IN ELECTROPHOTOGRAPHIC COPYING

CROSS-REFERENCE TO RELATED APPLICATIONS

This application claims the benefit of and priority to U.S. Provisional Patent Application No. 62/460,636 filed Feb. 17, 2017 and entitled "SYSTEMS AND METHODS FOR IMAGE OPTIMIZATION AND ENHANCEMENT IN ELECTROPHOTOGRAPHIC COPYING" which is incorporated herein by reference in its entirety.

TECHNICAL FIELD

One or more embodiments of the present disclosure relate generally to optimizing and enhancing images for electrophotographic printing including, for example, correction of misalignment errors in a scanned digital image.

BACKGROUND

The use of electrophotographic printing (commonly known as laser and LED printing) within digital copiers and multifunction printers poses algorithmic challenges for copy mode image processing.

For many electrophotographic print engines, the highest overall print reproduction quality is obtained using halftoning based on line or dot screens. Such halftoning techniques may modulate image data with fixed 75-250 cycles/inch patterns prior to printing. In dark image areas, the duty cycle for toner application may approach 100%. In light areas, the duty cycle may approach 0%. The human internal perception system averages away the halftone pattern, leaving the illusion of smooth shades. However, printing using screen based halftoning techniques may produce print artifacts, such as when the frequency content of the image to be printed causes interference or "beat" patterns with the halftone screen modulation. Copy operations (as opposed to printing directly from a digital image) are particularly prone to interference artifacts as the source document often contains screen based halftoning itself, with frequency content similar to that of the print engine screening.

Interference patterns caused by overlapping patterns between image data and halftone screening may be reduced by applying a low pass filter to the image data prior to screening and printing the image. However, indiscriminately applying the low pass filter to the image data may yield unacceptable blurring of certain image features such as text.

Conventional solutions attempt to resolve this problem by limiting the application of low pass filtering to regions of the scanned document determined to be halftoned. These conventional solutions may yield acceptable results in some cases, but artifacts may still be observed when strong edges are present in halftoned regions. Examples include strong edges in halftoned photographic content regions and black text on a halftoned background. In each case, the lack of low pass filtering very close to the strong edges in combination with the application of low pass filtering in areas farther away from strong edges results in distracting interference patterns.

Another problem that electrophotographic print engines often face is misalignment of color constituents in color printing. Color printers based on electrophotographic techniques typically do not have perfect alignment of the constituent cyan (C), magenta (M), yellow (Y), and black (K) toner planes. Misalignments of color constituents vary over the width and height of the page, and could be up to ⅓₀₀ inches in conventional systems. For copy operations, reproduction of dark text is particularly prone to misalignment artifacts, as dark shades are typically produced by a mix of CMYK toners. Misalignment results in non co-located toner edges and thus, fuzzy or haloed text reproduction.

To compensate for electrophotographic toner misalignment during print (rather than copy) operations, most approaches rely on understanding the elements to be printed at the object level rather than the pixel level. In reproducing dark text, for instance, the print rendering will often generate C, M, and Y renderings of characters which are "eroded" from the full K rendering. As such, the full K rendering will eclipse any C, M, or Y which would otherwise sneak out due to misalignment. Yet, at the center of the text, the mix of C, M, Y, and K would still yield the desired color tone.

Compensating for misalignment during copy operations is much more difficult when an understanding of the image elements is not readily available. In the past, attempts have been made to compensate for electrophotographic toner misalignment during copy operations using a couple of different algorithms. For example, under one approach, regions of black text on white background are detected. The detected area is then reproduced with a separate K only color table. However, this approach is prone to have issues due to imperfect black text classification. In addition, there was no compensation for text which was dark yet not deemed black by the classification process.

Under another approach, the image processing algorithm is tuned to focus on edge sharpening and enhancement in the luminance component. Once processed, the edges of dark text in the image would tend to saturate on the neutral axis, near white and black. This processing helps to limit color (color other than black) at the edge of the text. A drawback of this approach is that it may require the printer to be configured such that color tones on the neutral axis are reproduced with K only.

In view of the foregoing, there is a continued need in the art for improvements in optimizing and processing images for printing to minimize artifacts introduced during the scanning and/or printing operations.

SUMMARY

Various embodiments are provided for enhancing a digital image for printing. In some embodiments, a computer-implemented method for enhancing an image for printing includes identifying a plurality of true edge positions in the image, generating an edge restoration signal based on image data at the plurality of true edge positions, generating a boost value for each pixel position in the image as a function of the edge restoration signal and an unsharp masking of the image, and applying the generated boost values to the image to generate an enhanced image.

In some embodiments, a system includes a print interface communicatively coupled with a print engine, an image interface operable to receive an image comprising a plurality of pixels having a plurality of color components without an explicit K component, and an image processing module communicatively coupled with the print interface and the image interface. The image processing module may be operable to compute, for each pixel position in the image, a halftone energy measure, an edge strength, and a colorfulness measure based on color values corresponding to the plurality of color components at the pixel position, generate a K component for the image based on the halftone energy measure, the edge strength, and the colorfulness measure computed for each pixel position, and output data representing the image and a K component to the print engine via the print engine.

The scope of the invention is defined by the claims, which are incorporated into this section by reference. A more complete understanding of embodiments of the invention will be afforded to those skilled in the art, as well as a realization of additional advantages thereof, by a consideration of the following detailed description. Reference will be made to the appended sheets of drawings that will first be described briefly.

The included drawings are for illustrative purposes and serve only to provide examples of possible systems and methods for the disclosed system and methods to optimize and enhance an image for printing by an electrophotographic print engine. These drawings in no way limit any changes in form and detail that may be made to that which is disclosed by one skilled in the art without departing from the spirit and scope of this disclosure.

DETAILED DESCRIPTION

Various embodiments of systems and methods disclosed herein may be used to optimize and enhance an image for printing by an electrophotographic print engine. The image may be obtained as a digital file. More particularly, the digital file may be a scanned file by scanning a physical printed document with an image scanner, where the physical printed document was printed using a halftone printing method. The physical printed document may in turn be produced by printing, using a halftone method, from an original digital file. It is noted that the document reproduction process (e.g., halftone printing, scanning, and halftone printing process) produces many artifacts, and the resulting printed document will suffer greater degradation as the process repeats itself (e.g., photocopying a photocopied image). The techniques disclosed herein in accordance with various embodiments provide an improvement in restoring the document for reproduction, including by improving edge enhancement in halftoned regions of the image and the ability to reduce or eliminate K toner from the edges of black text, thereby avoiding color fringing.

Figure 1:
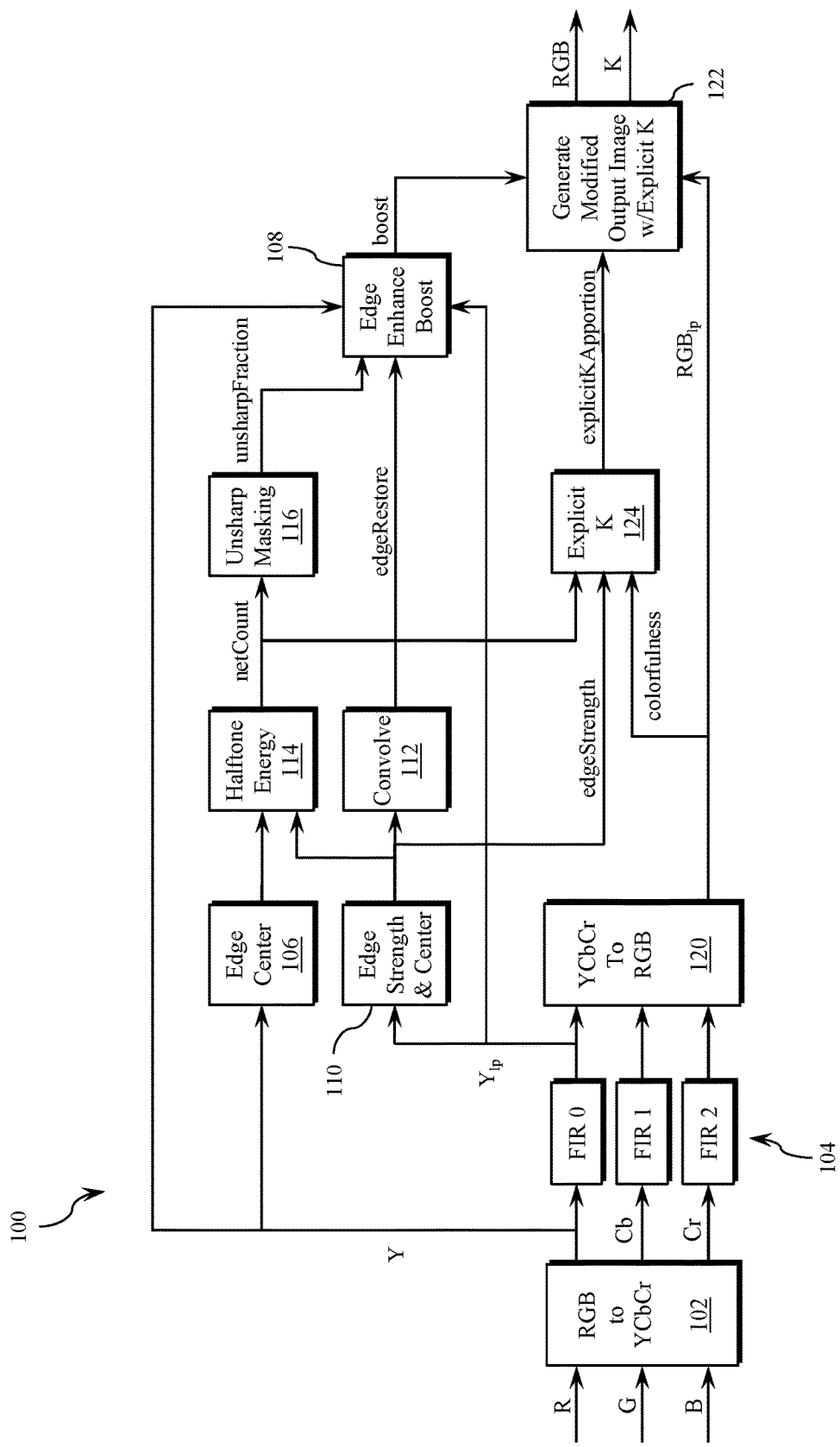
FIG. 1 illustrates an image optimization process in accordance with one or more embodiments of the present disclosure.

FIG. 1 illustrates the image optimization techniques in accordance with various embodiments disclosed herein. An image optimization process 100 receives an image, which may be a digital image file obtained by scanning a physical printed document using an image scanner. As mentioned above, the printed document may be produced by printing an original digital file, using, for example, a frequency based screening (halftone) method. The scanned document is typically stored in a format that is convenient for a computer to display (e.g., an RGB (red, green, blue) format).

In some embodiments, the image optimization techniques disclosed herein operate on the luminance values that correspond to a luminance component of an image separately from color values that correspond to the chrominance components of the image. Thus, when an image in a native format that does not have a separate luminance component is received (e.g., an image in an RGB format), for example, when the image is generated by scanning a physical document using an image scanner, the image is converted (in block 102) from the native format to a format having a separate luminance component (e.g., a YCrCb format). In the event that the image's native format is an RGB format, an RGB to YCrCb conversion is performed on the image to generate a converted image having a separate luminance (Y). An image in the YCrCb format has a luminance (Y) component along with two chrominance components (Cr and Cb). In another example, when the image's native format is a greyscale format, the greyscale input is used as the values of the luminance (Y) component, and zeros are used for the chrominance components (Cr and Cb).

The Y, Cb and Cr components are provided to a set of filters 104 (such as finite impulse response (FIR) filters labeled as FIR 0, FIR 1, and FIR 2, respectively, and collectively as filters 104 in FIG. 1). In some embodiments, the filters 104 include low pass filters to suppress halftoning noise present in the input image. The filters 104 may be tuned optimally to suppress halftoning noise settings, for example, based on empirical data prior to performing this filtering process. As mentioned above, the received image may be obtained from scanning a physical document. The physical document could be produced by printing using the halftone technique, which introduces various artifacts to the document. This filtering process aims to suppress the artifacts (noise) due to the printing of the physical document.

It is noted that the techniques disclosed herein in accordance with various embodiments may include operations on both the luminance values in the original luminance component (referred to hereinafter as the "Y" component) and the filtered luminance values in the filtered luminance component (referred to hereinafter as the "Ylp" component), that is, the resulting luminance values after applying the filter FIR 0 to the luminance value in the original luminance component. In some embodiments, the luminance (Y) and low pass (filtered) luminance (Ylp) signals are processed to create maps of true edges and edge strength, a measure of the halftone energy at each pixel location, and a per pixel boost value intended to be added to the Ylp image to enhance true edges.

For example, below illustrates the luminance values (Y) of an image obtained by scanning a physical print document using a halftone technique.

| 0 | 1 | 0 | 1 | 1 | 1 |
| 0 | 0 | 0 | 1 | 0 | 1 |
| 0 | 1 | 0 | 1 | 1 | 1 |
| 0 | 0 | 0 | 1 | 0 | 1 |
| 0 | 1 | 0 | 1 | 1 | 1 |

Below illustrates example filtered luminance values (Ylp) of the image after applying a low pass filter to the image.

| | | | | | |
|---|---|---|---|---|---|
| 0.282074979 | 0.343749195 | 0.440491219 | 0.561549566 | 0.658493388 | 0.720397917 |
| 0.279602083 | 0.341506612 | 0.438450434 | 0.559508781 | 0.656250805 | 0.717925021 |
| 0.282074979 | 0.343749195 | 0.440491219 | 0.561549566 | 0.658493388 | 0.720397917 |
| 0.279602083 | 0.341506612 | 0.438450434 | 0.559508781 | 0.656250805 | 0.717925021 |
| 0.282074979 | 0.343749195 | 0.440491219 | 0.561549566 | 0.658493388 | 0.720397917 |

In the illustrated embodiment, the unfiltered Y component is provided to edge center block 106 and edge enhance boost block 108. The filtered luminance value, $Y_{lp}$ is also provided to edge enhance boost block 108 and edge strength and center block 110. At edge strength and center block 110, a Ylp map of true edges and edge strength may be generated by calculating and examining the gradient of the Ylp signal. Edge strength is computed in edge strength and center block 110 for each pixel position to indicate a likelihood that the pixel position represents an edge in the image.

In some embodiments, examining the gradient of the Ylp signal involves computing a gradient in various directions (e.g., a gradient in a horizontal (x) direction and a gradient in a vertical (y) direction) at different locations on the image. The gradient in a direction may be computed by taking a difference between the luminance values of two pixels adjoining in that direction. In some of these embodiments, the edge strength may be expressed as the square root of the sum of the square of the gradient in the x direction and the square of the gradient in the y direction.

In the above example, the gradient values in the x direction for the filtered image are:

| | | | | | |
|---|---|---|---|---|---|
| 0.061674216 | 0.096742024 | 0.121058347 | 0.096943823 | 0.061904529 | 0.022209134 |
| 0.061904529 | 0.096943823 | 0.121058347 | 0.096742024 | 0.061674216 | 0.022072583 |
| 0.061674216 | 0.096742024 | 0.121058347 | 0.096943823 | 0.061904529 | 0.022209134 |
| 0.061904529 | 0.096943823 | 0.121058347 | 0.096742024 | 0.061674216 | 0.022072583 |
| 0.061674216 | 0.096742024 | 0.121058347 | 0.096943823 | 0.061904529 | 0.022209134 |

Pixel positions for which both the edge strength is greater than a predetermined threshold and the gradient is a local maximum are then designated as edge centers for the Ylp component. A local maximum may be defined as having a largest gradient in that direction within a pre-defined boundary centered around the pixel position (e.g., among the pixel at the pixel position and the two neighboring pixels of the pixel position in that direction, etc.).

In the example given above, the following edge centers may be identified based on the gradients information:

| | | | | | |
|---|---|---|---|---|---|
| 0 | 0 | 1 | 0 | 0 | 0 |
| 0 | 0 | 1 | 0 | 0 | 0 |
| 0 | 0 | 1 | 0 | 0 | 0 |
| 0 | 0 | 1 | 0 | 0 | 0 |
| 0 | 0 | 1 | 0 | 0 | 0 |

Based on the Ylp map and the edge center information generated at edge strength and center block 110, an edge restoration signal may be generated for the image. The edge restoration signal is generated with the goal of restoring edges which may have been blurred due to the low pass filtering. It has been contemplated that the Ylp gradients at edge center positions provide a good indication of the strength and orientation of true edges in the luminance component of the image. As such, the edge restoration signal is generated by convolving (at block 112) the Ylp zeroed at locations other than edge centers gradients with predetermined filter kernels (e.g., a 8×8 filter kernel), one filter kernel for the x component of the gradient and a second filter kernel for the y component of the gradient.

In the example given above, the edge restoration signals are defined as:

| | | | | | |
|---|---|---|---|---|---|
| −0.033101892 | −0.093631065 | −0.195774045 | 0.195774045 | 0.093631065 | 0.033101892 |
| 0.033101892 | −0.093631065 | −0.195774045 | 0.195774045 | 0.093631065 | 0.033101892 |
| −0.033101892 | −0.093631065 | −0.195774045 | 0.195774045 | 0.093631065 | 0.033101892 |
| −0.033101892 | −0.093631065 | −0.195774045 | 0.195774045 | 0.093631065 | 0.033101892 |
| −0.033101892 | −0.093631065 | −0.195774045 | 0.195774045 | 0.093631065 | 0.033101892 |

The above example edge restoration signals were generated by convolving the gradients of the image using the following x-gradient convolution kernel core:

| | | | | | | |
|---|---|---|---|---|---|---|
| 0 | 1 | 3 | 5 | −5 | −3 | −1 | 0 |
| 1 | 4 | 13 | 22 | −22 | −13 | −4 | −1 |
| 3 | 12 | 32 | 61 | −61 | −32 | −12 | −3 |
| 4 | 18 | 51 | 119 | −119 | −51 | −18 | −4 |
| 4 | 18 | 51 | 119 | −119 | −51 | −18 | −4 |
| 3 | 12 | 32 | 61 | −61 | −32 | −12 | −3 |
| 1 | 4 | 13 | 22 | −22 | −13 | −4 | −1 |
| 0 | 1 | 3 | 5 | −5 | −3 | −1 | 0 |

Below illustrates another example of convolution kernels described by the convolution filter tap tables:

| x-gradient convolution kernel: | | | | | | | |
|---|---|---|---|---|---|---|---|
| −TAP[15] | −TAP[14] | −TAP[13] | −TAP[12] | TAP[12] | TAP[13] | TAP[14] | TAP[15] |
| −TAP[11] | −TAP[10] | −TAP[09] | −TAP[08] | TAP[08] | TAP[09] | TAP[10] | TAP[11] |
| −TAP[07] | −TAP[06] | −TAP[05] | −TAP[04] | TAP[04] | TAP[05] | TAP[06] | TAP[07] |
| −TAP[03] | −TAP[02] | −TAP[01] | −TAP[00] | TAP[00] | TAP[01] | TAP[02] | TAP[03] |
| −TAP[03] | −TAP[02] | −TAP[01] | −TAP[00] | TAP[00] | TAP[01] | TAP[02] | TAP[03] |
| −TAP[07] | −TAP[06] | −TAP[05] | −TAP[04] | TAP[04] | TAP[05] | TAP[06] | TAP[07] |
| −TAP[11] | −TAP[10] | −TAP[09] | −TAP[08] | TAP[08] | TAP[09] | TAP[10] | TAP[11] |
| −TAP[15] | −TAP[14] | −TAP[13] | −TAP[12] | TAP[12] | TAP[13] | TAP[14] | TAP[15] |

| y-gradient convolution kernel: | | | | | | | |
|---|---|---|---|---|---|---|---|
| −TAP[31] | −TAP[30] | −TAP[29] | −TAP[28] | −TAP[28] | −TAP[29] | −TAP[30] | −TAP[31] |
| −TAP[27] | −TAP[26] | −TAP[25] | −TAP[24] | −TAP[24] | −TAP[25] | −TAP[26] | −TAP[27] |
| −TAP[23] | −TAP[22] | −TAP[21] | −TAP[20] | −TAP[20] | −TAP[21] | −TAP[22] | −TAP[23] |
| −TAP[19] | −TAP[18] | −TAP[17] | −TAP[16] | −TAP[16] | −TAP[17] | −TAP[18] | −TAP[19] |
| TAP[19] | TAP[18] | TAP[17] | TAP[16] | TAP[16] | TAP[17] | TAP[18] | TAP[19] |
| TAP[23] | TAP[22] | TAP[21] | TAP[20] | TAP[20] | TAP[21] | TAP[22] | TAP[23] |
| TAP[27] | TAP[26] | TAP[25] | TAP[24] | TAP[24] | TAP[25] | TAP[26] | TAP[27] |
| TAP[31] | TAP[30] | TAP[29] | TAP[28] | TAP[28] | TAP[29] | TAP[30] | TAP[31] |

Below illustrates the resulting luminance values of the image after applying the edge restoration signals provided in the example above:

| | | | | | |
|---|---|---|---|---|---|
| 0.248973087 | 0.25011813 | 0.244717174 | 0.757323611 | 0.752124453 | 0.753499809 |
| 0.246500191 | 0.247875547 | 0.242676389 | 0.755282826 | 0.74988187 | 0.751026913 |
| 0.248973087 | 0.25011813 | 0.244717174 | 0.757323611 | 0.752124453 | 0.753499809 |
| 0.246500191 | 0.247875547 | 0.242676389 | 0.755282826 | 0.74988187 | 0.751026913 |
| 0.248973087 | 0.25011813 | 0.244717174 | 0.757323611 | 0.752124453 | 0.753499809 |

After the edge restoration signal is generated, a boost value may be computed for each pixel position in edge enhance boost block 108. The boost value is added to the filtered pixel values (the pixel values after having been applied with the low pass filter) to enhance the true edges. In some embodiments, the boost values may be computed through a combination of unsharp masking block 116 and enhancement with the edge restoration signal.

In some embodiments, the relative contributions of the unsharp masking and edge restoration enhancement may be determined by the halftone energy measures at the various pixel positions. The halftone energy measures may be computed in halftone energy block 114 as a function of the number of edge centers in the luminance (Y) component generated by edge center block 106, and the number of edge centers in the filtered luminance (Ylp) component. In order to determine edge centers in the luminance (Y) component, a Y map of edges and edge strength may be generated using the same technique as described above on the Y signal, for example, by calculating and examining the gradient of the Y signal. For the Y map, the edge strength may be computed using the luminance values in the Y component. Pixel positions for which both the edge strength is greater than a predetermined threshold and the gradient is a local maximum are then designated as edge centers for the Y component.

A measure of halftone energy for a pixel position may be obtained in halftone energy block 114 by comparing the number of edge centers in the Y component relative to the number of edge centers in the Ylp component within a predetermined region (e.g., a 16×16 region) centered on the pixel position. The computation yields a net count of halftone only edge centers for the predetermined region centered on the pixel position. In some embodiments, the net count can be computed using the following expression:

$$netCount = yEdgeCenters - EdgeCenterScale \times ylpEdgeCenters$$

where yEdgeCenters is the number of edge centers in the luminance component within the region, ylpEdgeCenters is the number of edge centers in the filtered component within the region, and EdgeCenterScale is a predetermined scaling factor.

It is noted that in areas with strong halftone energy, it may be desirable to limit the amount of contribution from the unsharp masking to avoid conveying halftone noise to the output image. By contrast, in areas of low halftone energy, a strong contribution from the unsharp masking yields crisp, well positioned edges. In some embodiments, an unsharp look up table may be generated at unsharp masking block 116 to provide the mapping of the unsharp mask contribution for each pixel position. The details of one embodiment of the computation are as follows:

$$boostUnsharp = (Y - Ylp) \times unsharpAlpha$$

$$boostRestore = edgeRestore \times restoreAlpha$$

$$netCountOffsetScale = (netCount - netCountOffset) \times netCountScale$$

$$unsharpFraction = LinearInterpolate(unsharpLUT, netCountOffsetScale)$$

$$boost = boostUnsharp \times unsharpFraction + boostRestore \times (1 - unsharpFraction)$$

if (edgeRestore>=0 &&
   edgeRestore<noiseThreshold0 && boost<0 &&
   boost>noiseThreshold1), then boost=0.

The boost values are then applied to the luminance values at the corresponding pixel positions in block 122 to generate a modified output image. In some embodiments, the boost values may be directly applied to the luminance values that correspond to the luminance channel. In other embodiments, the boost values may be applied to pixel values that correspond to the components in the image's native format. For example, the converted image (with the filtered luminance and color components) may be converted back to the image's native format (e.g., the RGB format) in block 120 to produce a low pass RGB image, RGBlp. The boost values may then be added to the pixel values of the color components in the image's native format to form the color output in edge enhance boost block 108.

In some embodiments, in addition to the boost values, an explicit K output channel is generated at block 124. The explicit K output channel is used to provide to the electrophotographic print engine an explicit K component (e.g., the K value in the CMYK format that is usually used by print engines) for the various pixel positions. In some embodiments, at least a portion of the output signal at a pixel position for which edge enhancement boost is non-zero will be converted into an explicit K value. As such, the explicit K channel is used to emphasize edges. In some of these embodiments, the apportioning of the output signal to the explicit K channel is determined by a three-dimensional look-up table (3D LUT) at block 124 indexed by a pixel's (1) halftone energy measure (netCount, generated by halftone energy block 114), (2) edge strength (generated by edge strength and center block 110), and (3) colorfulness measure (from the RGBlp output of block 120). In one embodiment, the output of the 3D LUT is a value in the range from 0.0 to 1.0. A value of 0.0 corresponds to no generation of explicit K value (or a value of zero). A value of 0.5 corresponds to a delivery of 100% of the edge enhancement boost signal and 0% of the RGBlp gray signal on the explicit K channel. A value of 1.0 corresponds to delivery of 100% of the edge enhancement boost signal and 100% of the RGBlp gray signal on the explicit K channel. The detailed calculations for the explicit K apportioning of one embodiment are as follows:

gray=max(*Rlp,Glp,Blp*)

colorfulness=3×gray−*Rlp*−*Glp*−*Blp* netCountOffsetScale=(netCount−netCountOffset)× netCountScale edgeStrengthOffsetScale=(edgeStrength−edgeStrengthOffset)×edgeStrengthScale colorfulnessOffsetScale=(colorfulness−colorfulnessOffset)×colorfulnessScale explicit*K*Apportion=TriLinearinterpolate(explicit*K*-LUT,netCountOffsetScale,edgeStrengthOffsetScale,colorfulnessOffsetScale)

Once the explicit K apportion signal is computed it directs the development of the explicit K and output signals. The detailed calculations of one embodiment are as follows:

```
if (boost > 0) {
    boostDarken = 0;
    boostLighten = boost;
} else {
    boostDarken = -boost;
    boostLighten = 0;
}
Kgray = 1.0 - gray;
if (explicitKApportion = 0) {
    R = Rlp + boostLighten - boostDarken;
    G = Glp + boostLighten - boostDarken;
    B = Blp + boostLighten - boostDarken;
    K = 0;
} else if (explicitKApportion < 0.5) {
    fk = explicitKApportion / 0.5;
    R = Rlp + boostLighten - (1.0 - fk) × boostDarken;
    G = Glp + boostLighten - (1.0 - fk) × boostDarken;
    B = Blp + boostLighten - (1.0 - fk) × boostDarken;
    K = fk × boostDarken;
} else if (explicitKApportion = 0.5) {
    R = Rlp + boostLighten;
    G = Glp + boostLighten;
    B = Blp + boostLighten;
    K = boostDarken;
} else if (explicitKApportion < 1.0) {
    fk = (explicitKApportion - 0.5) / 0.5;
    R = Rlp + fk × Kgray + boostLighten;
    G = Glp + fk × Kgray + boostLighten;
    B = Blp + fk × Kgray + boostLighten;
    K = fk × Kgray + boostDarken;
} else if (explicitKApportion = 1.0) {
    R = Rlp + Kgray + boostLighten;
    G = Glp + Kgray + boostLighten;
    B = Blp + Kgray + boostLighten;
    K = Kgray + boostDarken;
}
```

The processed image file in the file's native format (and optionally along with the explicit K output channel) is then sent to an electrophotographic print engine for printing. In some embodiments, the processed image file may be converted to a common printing format (e.g., a CMYK format) to align with the various color toners of a printer. In some of these embodiments, the explicit K output channel will be used to supplement the K component derived from the traditional process of converting the processed image file to the printing format. A printed document may be printed using, for example, a halftone technique based on the processed image file and the explicit K output channel. It is noted that the various image optimization techniques disclosed herein advantageously process the scanned image file to restore the appearance to look more like the original file, which enables the printed document to appear more closely to the original file than conventional techniques.

The derivation and use of an edge restoration signal allows both edge enhancement and source document halftone noise rejection. In addition, the development of an explicit K output channel in addition to the customary RGB or YCbCr output allows great flexibility in tone reproduction at edge regions (in particular, the use of K only for edges of dark text to avoid misalignment artifacts) while placing no constraints on CMYK mix for tone reproduction in non-edge regions.

Figure 2:
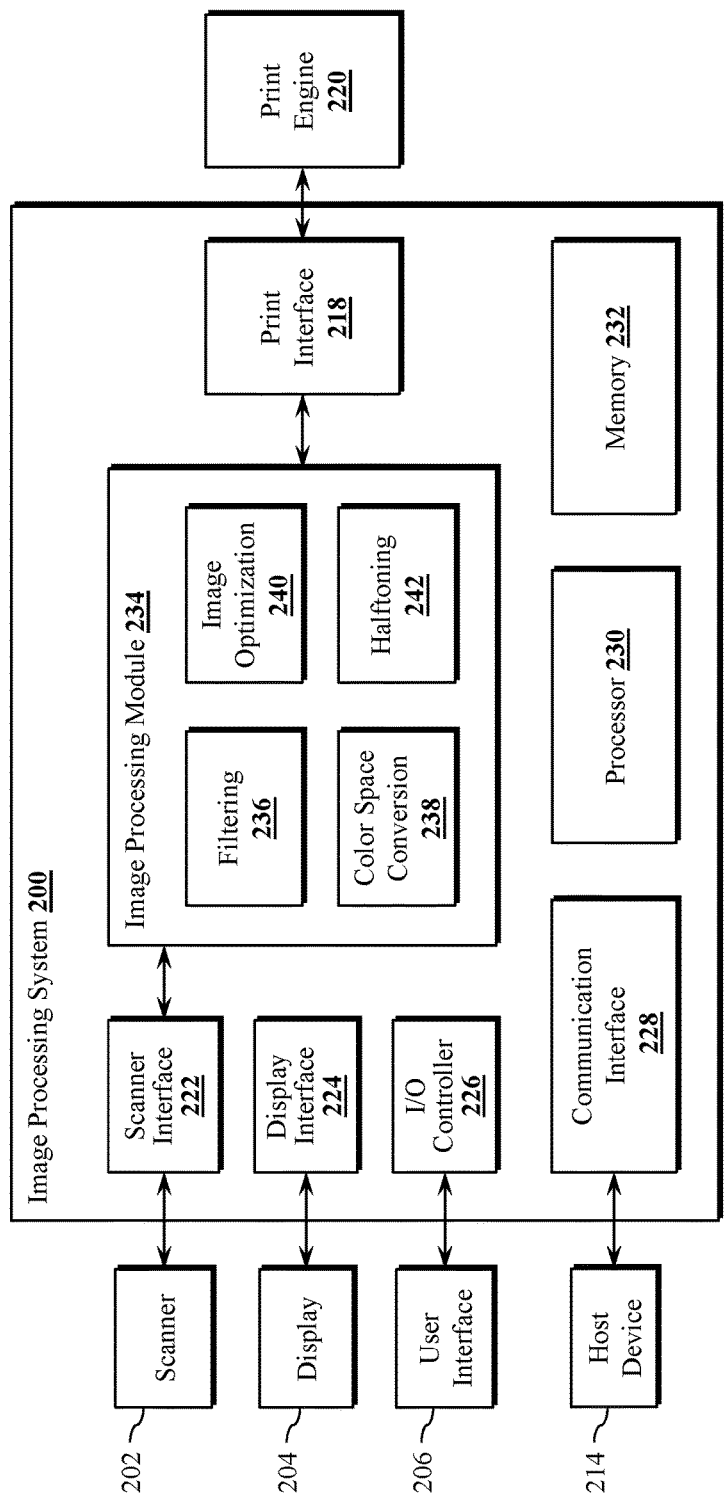
FIG. 2 illustrates an image processing system in accordance with one or more embodiments of the present disclosure.

FIG. 2 illustrates an image processing system 200 of some embodiments that performs at least part of the image optimization described above to process images. The image processing system 200 may be implemented as part of a commercial printer, such as a laser printer, an LED printer, a photocopy machine, a multifunction printer, or as part of a computing system that is communicatively coupled with a printer. The image processing system 200 may be communicatively coupled with one or more communication devices such as a scanner 202 (e.g., a charge coupled device (CCD) or contact image sensor (CIS) scanner) for scanning documents, a display 204 for providing information of the image processing system 200 to users, and a user interface 206 such as a touch screen and/or keyboard for enabling a user to provide input to image processing system 200. In alternate embodiments, the image processing system 200 may be coupled to a facsimile, a Bluetooth connector for communicating with external devices using the Bluetooth protocol, a WiFi connector for communicating with external devices using WiFi protocol, a Universal Serial Bus (USB) connector for communicating with an external drive, and/or a host device 214. The image processing system 200 may also be communicatively coupled with a print engine 220 through a print interface 218 for printing images that have been processed by the image processing system 200.

In some embodiments, the image processing system 200 may include an image interface for receiving an image, such as scanner interface 222 for interacting with scanner 202, a display interface 224 for interacting with display 204, an input/output controller 226 for interacting with user interface 206, and a communication interface 228 for interacting with a host device 214 or other external devices.

Image processing system 200 also includes memory 232 that stores software instructions for performing image processing processes described above and other data necessary for the performance of the image processing processes, and one or more processors 230, which can be a micro-controller, a digital signal processor (DSP), or other processing components, for executing the software instructions stored in memory 232 and controlling and facilitating the operations of the image processing system 200, including controlling communications with internal and external devices.

Figure 3:
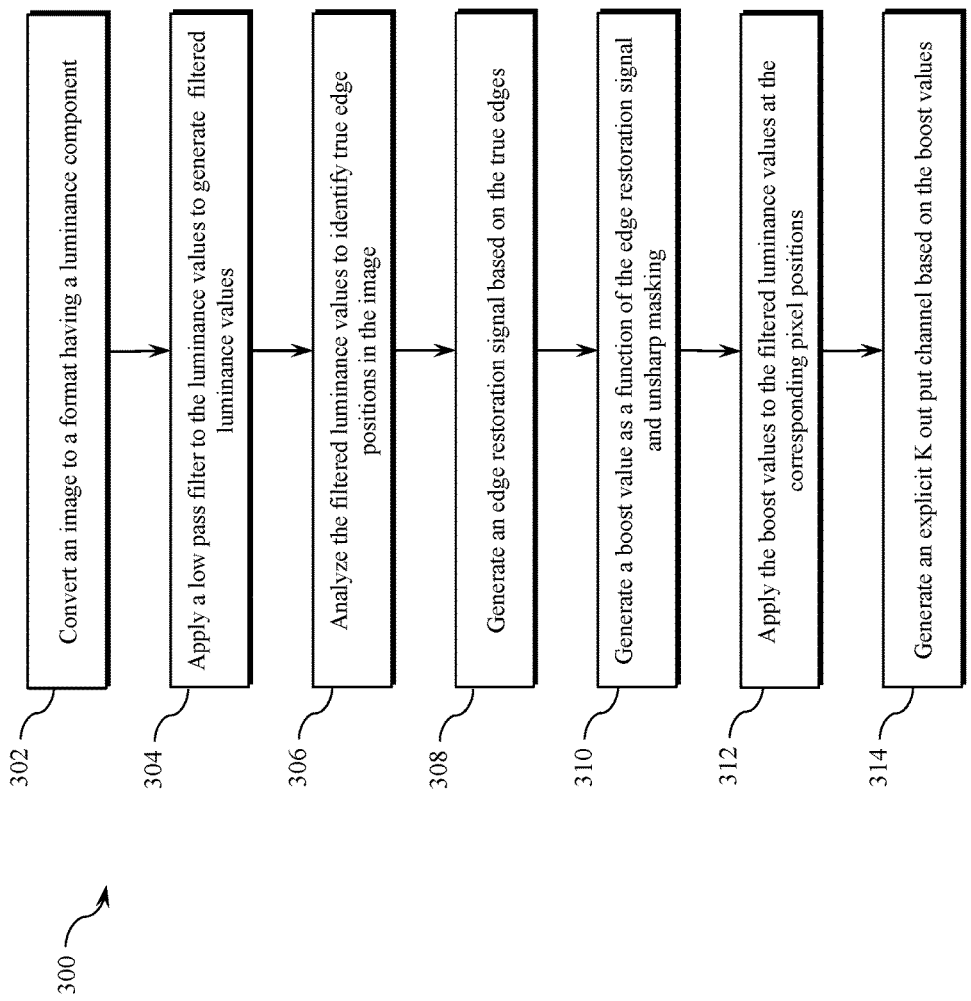
FIG. 3 is a flow chart illustrating an image optimization process in accordance with one or more embodiments of the present disclosure.

Image processing system 200 also includes image processing module 234 that is programmed to perform the image processing processes described herein in FIGS. 1 and 3. Specifically, image processing module 234 includes a filtering module 236 that includes one or more filters (e.g., a low pass filter, etc.) for performing filtering to the different components of an image as described above, a color space conversion module 238 for converting images from one color format to another format (e.g., from RGB format to YCbCr format), an image optimization module 240 for generating per pixel boost values and modifying the image based on the per pixel boost values as described above, and a halftoning module 242 for generating halftone data based on the processed image before sending the halftone data to print engine 220 for printing. The image processing module 234 may further include modules corresponding to one or more of the processes described with reference to FIGS. 1, 3 and 4, including an explicit K module for generating an explicit K component provided to the print engine.

FIG. 3 is a flow diagram of a process 300 to optimize and enhance images for printing in accordance with an embodiment of the disclosure. Process 300 may be performed by various components of image processing system 200. However, it should be appreciated that image processing system 200 and various components thereof are identified only for purposes of giving examples, and that any other suitable system may be utilized to perform all or part of process 300. It should also be appreciated that any block, sub-block, step, sub-step, or sub-process of process 300 may be combined and/or performed in an order or arrangement different from the embodiment illustrated by FIG. 3.

Process 300 begins with converting (at step 302) an image to a format having a separate luminance component, if the image is not already in a format that has a separate luminance. For example, color space conversion module 238 may be configured to convert an image from a native format (e.g., an RGB format) to a format that has a separate luminance component (e.g., a YCrCb format).

In step 304, a filter (e.g., a low pass filter) is applied to the luminance values (pixel values that correspond to the luminance component) of the image to generate filtered luminance values in order to suppress halftone noise. The halftone noise may have been introduced to a physical document when the physical document was produced by printing using a halftone technique. For example, filtering module 236 may be configured to perform a low pass filtering to the luminance values of the image.

Process 300 then analyzes (at step 306) the filtered luminance values to identify true edge positions in the image. For example, image optimization module 240 may be configured to perform a series of analyses, including computing edge strength values based on gradients for each pixel position, as described above to identify positions in the image that are considered to be true edges. Performing the analysis on the filtered luminance values (as opposed to the luminance values) helps prevent halftone edges (edges created from the halftone artifacts) from being included as true edges.

In step 308, process 300 generates an edge restoration signal for the image based on the image data at the true edge positions. For example, image optimization module 240 may be configured to generate the edge restoration signal by convolving gradients at the true edge positions. Process 300 then generates (at step 310) a boost value for each pixel position. For example, image optimization module 240 may be configured to compute an unsharp masking for the image and generate the boost value as a function of the edge restoration signal and the unsharp masking. In some embodiments, image optimization module 240 may be configured to apply different contribution factors of the unsharp masking to different pixel positions based on a halftone energy that is determined for the pixel positions.

In step 312, process 300 applies the boost values to the filtered luminance values to generate a processed image. For example, image optimization module 240 may be configured to apply the boost values to the filtered luminance values and optionally also to the chrominance values. In some embodiments, image optimization module 240 may be configured to apply the boost values to the pixel values of the image in its native format.

Process 300 may also generate (at step 314) an explicit K output channel. For example, image optimization module 240 may be configured to generate a K value for each pixel position based on a halftone energy measure, an edge strength value, and a colorfulness measure of the pixel position. The processed image and the K channel may then be sent to halftoning module 242 to produce print data before sending the print data to print engine 220 for printing.

Figure 4:
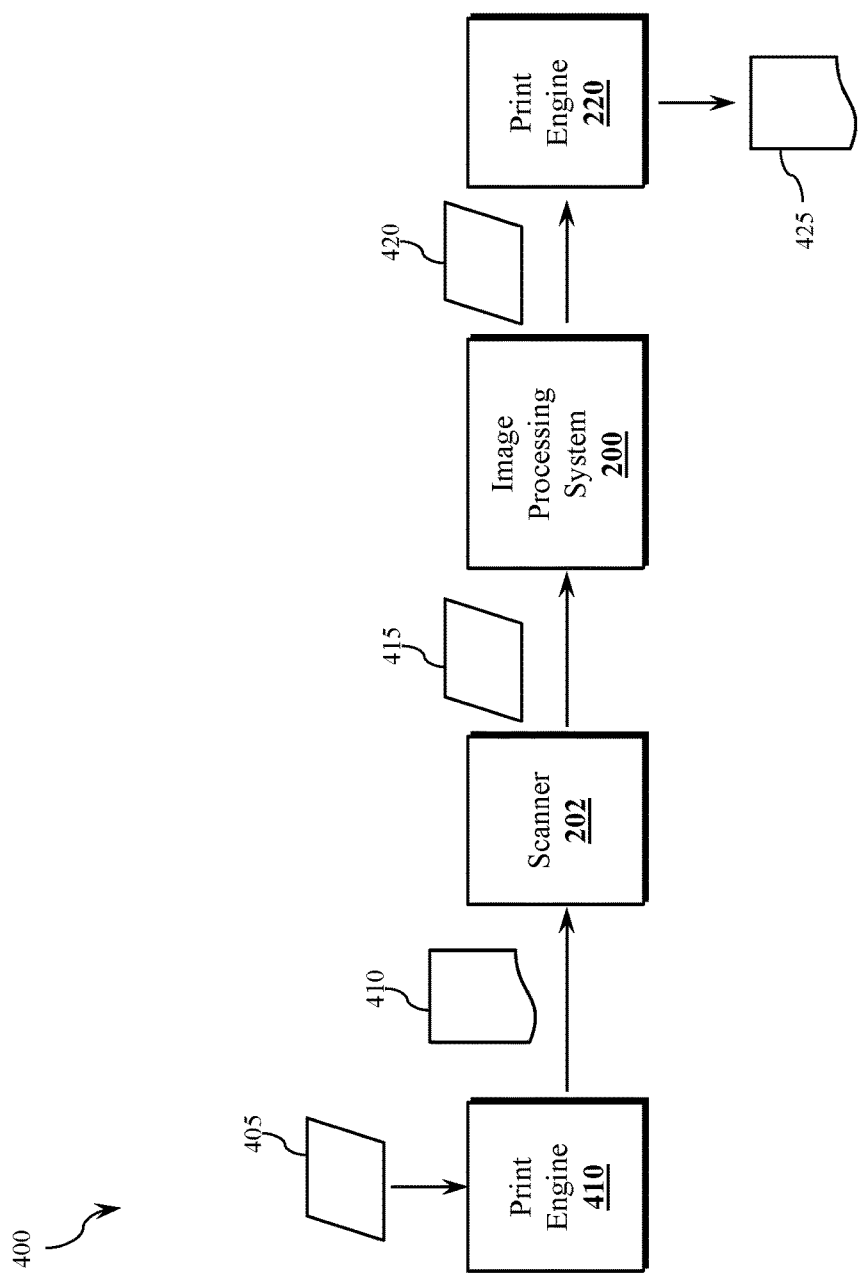
FIG. 4 illustrates an example use case of the image processing system in accordance with one or more embodiments of the present disclosure.

FIG. 4 illustrates an example use case 400 of the image processing techniques of some embodiments as disclosed herein. In example use case 400, a digital file 405 (e.g., a text document, a layout of a newspaper or magazine, etc.) is printed onto a physical document 410 using a print engine 220. Print engine 220 may use a frequency-based screening technique (halftoning) to produce document 410 based on digital file 405. Print document 410 may be a letter, part of a newspaper, or part of a magazine. For different reasons, a user who may not have access to the original digital file 405 may want to either store a digital copy of document 410 or reproducing document 410 (by photocopying document 410).

As discussed above, the use of frequency-based screening technique in printing a document causes numerous known artifacts such as interference patterns (moire) and color misalignment. As a result, document 410 becomes a degraded copy of the original digital file 405. The artifacts become even more pronounced as document 410 is reproduced (photocopied) (e.g., by scanning and printing again using a frequency-based screening technique). To mitigate these artifacts, it has been contemplated that after scanning document 410, by using scanner 202, to generate a scanned image 415, the scanned image is processed or optimized by image processing system 200 using the various image optimization techniques described herein. The image processing system 200 of some embodiments improves the scanned image 415 by restoring the at least some of the edges so that the processed image 420 appears more closely to the original digital file 405, before the processed image 420 is printed using print engine 220 to produce document 425. Using image processing system 200 to process the scanned image 415 before printing document 425 helps to reduce degradation from using conventional photocopying machines.

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, random access memory (RAM), flash, read only memory (ROM), etc.). The software instructions preferably program the computing device to provide the roles, responsibilities, or other functionality as discussed above with respect to the disclosed apparatus. In especially preferred embodiments, the various servers, systems, databases, or interfaces exchange data using standardized protocols or algorithms, possibly based on Hypertext Transfer Protocol (HTTP), HTTP Secure (HTTPS), Advanced Encryption Standard (AES), public-private key exchanges, web service application programing interfaces (APIs), known financial transaction protocols, or other electronic information exchanging methods. Data exchanges preferably are conducted over a packet-switched network, the Internet, local area network (LAN), wide area network (WAN), virtual private network (VPN), or other type of packet switched network.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer-implemented method for enhancing an image for printing, comprising:
    identifying a plurality of true edge positions in the image;
    generating an edge restoration signal based on image data associated with the plurality of true edge positions;
    computing a halftone energy value for each of the plurality of true edge positions in the image;
    generating, for each pixel position in the image, a boost value as a function of the edge restoration signal and an unsharp masking of the image, wherein a relative contribution of the unsharp masking for the boost value of the pixel position is determined based on a halftone energy value computed for the pixel position; and
    applying the generated boost values to the image to generate an enhanced image.

2. The computer-implemented method of claim 1, wherein the image has luminance values in a luminance component, and wherein the method further comprises:
    applying a filter to the luminance values to generate filtered luminance values in a filtered luminance component.

3. The computer-implemented method of claim 2, wherein the filter comprises a low pass filter.

4. The computer-implemented method of claim 2, wherein the plurality of true edge positions in the image are identified based at least in part on analyzing the filtered luminance values.

5. The computer implemented method of claim 2, wherein the generating the edge restoration signal is further based on the filtered luminance values associated with the plurality of true edge positions in the image.

6. The computer-implemented method of claim 2, further comprising computing an unsharp masking for the image as a function of a difference between the luminance values and the filtered luminance values.

7. The computer-implemented method of claim 1, further comprising:
    computing a gradient value at each of the plurality of true edge positions in the image; and
    convolving the gradient value with a filter kernel.

8. The computer-implemented method of claim 1, wherein the identifying the plurality of true edge positions comprises:
    computing an edge strength value for each position in the image as a function of a gradient at the position in the image; and
    identifying a position in the image as a true edge position when the computed edge strength value of the position is larger than a threshold.

9. The computer-implemented method of claim 1, further comprising computing a K channel for the image.

10. The computer-implemented method of claim 9, wherein the computing the K channel comprises computing, for each pixel position in the image, a K value as a function of a halftone energy measure, an edge strength, and a colorfulness measure of the pixel position.

11. A system, comprising:
a print interface communicatively coupled with a print engine;
an image interface operable to receive an image comprising a plurality of pixels having a plurality of color components without an explicit K component; and
an image processing module communicatively coupled with the print interface and the image interface, the image processing module operable to:
compute, for each pixel position in the image, a halftone energy measure, an edge strength, and a colorfulness measure based on color values corresponding to the plurality of color components associated with the pixel position;
generate a K component for the image based on the halftone energy measure, the edge strength, and the colorfulness measure computed for each pixel position; and
output data representing the image and the K component to the print engine via the print interface.

12. The system of claim 11, wherein the image processing module is further operable to apportion, for each pixel position, at least a portion of the color values corresponding to the plurality of color components to a K value.

13. The system of claim 11, wherein the image processing module is further operable to:
identify a plurality of true edge positions in the image;
generate an edge restoration signal based on image data associated with the plurality of true edge positions; and
generate a boost value for each pixel position in the image as a function of the edge restoration signal and an unsharp masking of the image.

14. The system of claim 13, wherein the image processing module is further operable to generate the K component by apportioning, for each pixel position, at least a portion of the generated boost value to the K value.

15. The system of claim 13, wherein the edge restoration signal is generated by:
computing a gradient value at each of the plurality of true edge positions in the image; and
convolving the gradient value with a filter kernel.

16. The system of claim 13, wherein the image processing module is further operable to determine, for each pixel position in the image, an unsharp masking contribution factor as a function of the corresponding halftone energy measure of the pixel position, and wherein the boost value is generated for the pixel position based on a contribution of the unsharp masking according to the unsharp masking contribution factor determined for the pixel position.

17. The system of claim 11, wherein the received image includes luminance values in a luminance component, and wherein the image processing module is further operable to
apply a filter to the luminance values to generate filtered luminance values in a filtered luminance component; and
compute an unsharp masking for the image as a function of a difference between the luminance values and the filtered luminance values.

18. The system of claim 11, wherein the received image includes luminance values in a luminance component, and wherein the image processing module is further operable to apply a filter to the luminance values to generate filtered luminance values, wherein the plurality of true edge positions in the image are identified based at least in part on analyzing the filtered luminance value.

19. The system of claim 11, wherein the image processing module is further operable to:
compute an edge strength value for each pixel position in the image as a function of a gradient at the pixel position in the image.

20. A computer-implemented method, comprising:
obtaining an image comprising a plurality of pixels having a plurality of color components without an explicit K component;
computing, for each pixel position in the image, a halftone energy measure based on color values corresponding to the plurality of color components at the pixel position;
generating a K component for the image based on the halftone energy measure computed for each pixel position; and
outputting data representing the image and the K component.

* * * * *